(12) United States Patent
van der Heide

(10) Patent No.: US 11,345,436 B2
(45) Date of Patent: May 31, 2022

(54) BICYCLE PEDAL ADAPTER

(71) Applicant: Marten Peter van der Heide, Amstelveen (NL)

(72) Inventor: Marten Peter van der Heide, Amstelveen (NL)

(*) Notice: Subject to any disclaimer, the term of this patent is extended or adjusted under 35 U.S.C. 154(b) by 0 days.

(21) Appl. No.: 17/006,585

(22) Filed: Aug. 28, 2020

(65) Prior Publication Data

US 2021/0061408 A1 Mar. 4, 2021

(30) Foreign Application Priority Data

Aug. 29, 2019 (EP) .................................. 19194379

(51) Int. Cl.
*B62M 3/08* (2006.01)
*B62M 3/16* (2006.01)
*F16B 5/06* (2006.01)

(52) U.S. Cl.
CPC ............ *B62M 3/086* (2013.01); *F16B 5/0621* (2013.01)

(58) Field of Classification Search
CPC ........ B62M 3/086; B62M 3/00; F16B 5/0621; B29C 70/742; B62K 19/16; Y10T 74/2164; B29L 2031/3091
USPC ........................................................ 74/594.6
See application file for complete search history.

(56) References Cited

U.S. PATENT DOCUMENTS

| | | | | |
|---|---|---|---|---|
| 4,942,778 A * | 7/1990 | Bryne | ..................... | B62M 3/086 36/131 |
| 5,806,379 A * | 9/1998 | Nagano | .................. | B62M 3/086 36/131 |
| 6,234,046 B1 * | 5/2001 | Coombe | ................. | B62M 3/086 74/594.6 |
| 7,013,754 B2 * | 3/2006 | Milanowski | ............. | B62M 3/08 74/594.6 |
| D755,684 S * | 5/2016 | Lucchesi | ....................... | D12/125 |
| D798,776 S * | 10/2017 | Gardner | ....................... | D12/125 |
| 10,759,492 B2 * | 9/2020 | Van Der Heide | ...... | B62M 3/083 |

(Continued)

FOREIGN PATENT DOCUMENTS

| EP | 3786050 A1 * | 3/2021 | .............. B62M 3/08 |
|---|---|---|---|
| FR | 2714014 * | 6/1995 | .............. B62M 3/08 |

(Continued)

OTHER PUBLICATIONS

Define a line, Google Search, Aug. 12, 2021 (Year: 2021).*

(Continued)

*Primary Examiner* — Vinh Luong

(57) ABSTRACT

This disclosure relates to a bicycle pedal adapter configured to be clicked onto a bicycle pedal for use with a bicycle shoe having a cleat. The bicycle pedal adapter is configured to convert the bicycle pedal to a bicycle pedal suitable for use with a shoe without a cleat. The, bicycle adapter does not comprise a toe-clip, and is free of a connecting member for connecting a toe-clip. The bicycle pedal adapter comprising a top wall comprising a foot support surface and a bottom surface, a central axis perpendicular to the foot support surface, a coupling for connecting the pedal adapter to the bicycle pedal, the coupling comprising a front and rear coupling part, a front restraining member provided at a left side and a right side of the front coupling part, a rear restraining member provided at a left side and a right side of the rear coupling part.

8 Claims, 17 Drawing Sheets

(56) References Cited

U.S. PATENT DOCUMENTS

| | | | | |
|---|---|---|---|---|
| 2013/0074647 A1* | 3/2013 | Swift | .................... | B62M 3/086 |
| | | | | 74/594.6 |
| 2016/0052593 A1* | 2/2016 | Lucchesi | ................ | B62M 3/086 |
| | | | | 74/594.4 |
| 2018/0154979 A1* | 6/2018 | Bjornsson | ................ | B62M 3/08 |
| 2019/0054977 A1* | 2/2019 | Golesh | .................. | B62M 3/086 |

FOREIGN PATENT DOCUMENTS

| | | | | |
|---|---|---|---|---|
| WO | WO 2017046660 | * | 3/2017 | .............. B62M 3/08 |
| WO | WO 2018/093266 A1 * | | 5/2018 | ............ B62M 3/086 |

OTHER PUBLICATIONS

Define a point, Google Search, Aug. 12, 2021 (Year: 2021).*
European Search Opinion of EP Application No. 19194379.4, dated Feb. 17, 2020 (Year: 2020).*

* cited by examiner

BICYCLE PEDAL ADAPTER

CROSS-REFERENCE TO RELATED APPLICATION

This application is based on and claims priority under 35 U.S.C. § 119 to European Patent Application No. 19194379.4 filed on Aug. 29, 2019 in the European Patent Office, the disclosure of which is incorporated by reference herein its entirety.

FIELD OF THE INVENTION

The present invention relates to a bicycle pedal adapter for use during cycling with regular shoes.

BACKGROUND OF THE INVENTION

Cycling has become a popular form of transportation for recreational as well as commuting purposes. Many bicycles, especially in the field of speed cycling, comprise step-in or clipless pedals. Said pedals are constructed to releasably engage a cleat that is mounted on the sole of a bicycle shoe. Said pedals roughly come in three types. The first type has cleat engagement mechanisms on both sides. This type is commonly used for off-road bikes. The second type has the engagement mechanism on just one side of the pedal. This second type is typically used on road-racing bicycles. A third type has cleat engagement on four sides. This third type is like the first type commonly used for off-road, or mountain bikes. A currently leading brand for said third type is CRANKBROTHERS™. The present invention mainly relates to the third type.

It was recognized in the present invention that without the correct cleats and shoes it is rather inconvenient and unsafe to cycle with the said clipless bicycle pedals. Cycling with regular shoes and no cleats is therefore not recommended. When a user still desires to cycle with his regular shoes on, he or she could switch between regular pedals and clipless pedals. This is however cumbersome, because it requires changing the pedals of a bike.

It is possible to use the bicycle pedal without any modifications. Although this is a possibility, it is rather unsafe because the user only has grip on two extending parts of the cleat engagement mechanism. In addition, both sides of the pedal are not flat and do not offer much grip.

A cleat adapter that solves the abovementioned problem of cycling with regular shoes and clipless pedals is known, such as published under number US2016052593 (A1). A disadvantage of the Fly Pedals is the difficult manual decoupling of the Fly Pedal from the pedal, as experienced by its users. In addition, the user has to buy an extra pair of normal cleats, because the Fly Pedals are mounted on a normal cleat. Alternatively, the user has to change the cleats between cycling with shoes having cleats and cycling with the Fly Pedals. The latter option more or less undoes the purpose of the Fly Pedal.

OBJECT OF THE INVENTION

An object of the invention is to provide a bicycle pedal adapter that can be both manually and easily coupled to and decoupled from a clipless bicycle pedal.

Yet another object of the invention is to provide a bicycle pedal adapter that can be easily manufactured.

Yet another object of the invention is to provide a bicycle pedal adapter that can be safely used.

SUMMARY OF THE INVENTION

In order to achieve at least one object, a bicycle pedal adapter is provided configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle adapter does not comprise a toe-clip, and wherein the bicycle adapter is free of a connecting member for connecting a toe-clip thereto, wherein the bicycle pedal adapter is flat, in particular having a height, a width and a length, wherein the width is more than four times the height and wherein the length is more than five times the height, and wherein the pedal adapter has a front end and a rear end, the bicycle pedal adapter further comprising:

a. a top wall defined by the width and length, the top wall comprising a foot support surface which faces upwards, and a bottom surface opposite the foot support surface, b. a central axis perpendicular to the foot support surface, c. a coupling for connecting the pedal adapter to the bicycle pedal, the coupling comprising:

i. a front coupling part provided between the front end and the rear end, the front coupling part being configured to mate with a first clamping member of the bicycle pedal, ii. a rear coupling part provided between the front coupling part and the rear end, the rear coupling part being configured to mate with a second clamping member of the bicycle pedal, d. a front restraining member provided at a left side and a right side of the front coupling part, and e. a rear restraining member provided at a left side and a right side of the rear coupling part, wherein the restraining members are configured to prevent rotation of the bicycle pedal adapter around the central axis thereof during use when the bicycle pedal adapter is coupled with the bicycle pedal, wherein the bicycle pedal adapter is configured to be clicked onto the bicycle pedal and to be uncoupled from the bicycle pedal.

An advantage of the invention is that a bicycle pedal which is intended and constructed to be used for a bicycle shoe having a cleat can be easily transformed into a bicycle pedal which can be safely used with a normal shoe without a cleat.

An advantage the bicycle pedal adapter further provides is that once the bicycle pedal adapter is coupled with the bicycle pedal rotation of the bicycle pedal adapter about its central axis is prevented due to the front and rear restraining member. This improves the safety, because for the user it will feel like the bicycle pedal adapter is one with the bicycle pedal. In addition decoupling due to rotation is prevented thereby providing a safe bicycle pedal adapter.

The fact that the bicycle pedal adapter can be decoupled from the bicycle pedal provides flexibility to the user, because he or she can still use the bicycle pedal with a shoe having a cleat.

Yet another advantage is that because the bicycle adapter is flat it can be transported easily, for example in the pockets of the user's pants or jersey.

In an embodiment of the bicycle pedal adapter, the front coupling part comprises a front base part extending downward from the bottom surface and a front protruding part extending in a forward direction from the front base part, wherein the front base part, the front protruding part and the bottom surface define a front clamping member cavity, and wherein the rear coupling part comprises a rear base part extending downward from the bottom surface and a rear protruding part extending in a rearward direction from the rear base part, wherein the rear base part, the rear protruding part and the bottom surface define a rear clamping member cavity.

In an embodiment of the bicycle pedal adapter, the front restraining member comprises a front left face and a front right face configured to abut respectively a left outer side and a right outer side of the first clamping member when coupled with the bicycle pedal, and the rear restraining member comprises a rear left face and a rear right face configured to abut respectively a left outer side and a right outer side of the second clamping member when coupled with the bicycle pedal.

In an embodiment of the bicycle pedal adapter, a first width of the front coupling part is smaller than a second width of the rear coupling part.

In an embodiment of the bicycle pedal adapter, a first distance 209 between a first face 217 and a second face 219 of the front restraining member, as measured along a line 211 proximate to the first coupling in a direction parallel to the axis of rotation of the pedal is smaller than a second distance 213 between a third face 221 and a fourth face 223 of the rear restraining member, as measured along a line 215 proximate to the second coupling in a direction parallel to the axis of rotation of the pedal. This prevents rotation of the bicycle pedal adapter about the central axis even more, because the first clamping member has a smaller width than the second clamping member.

In an embodiment, the bicycle pedal adapter comprises a left wall extending between a front end of the of the front coupling part and a rear end of the rear coupling part at a left side of the front and rear coupling part, and a right wall extending between a front end of the front coupling part and a rear end of the rear coupling part at a right side of the front and rear coupling part, the left and right wall defining the front and rear restraining members.

In an embodiment of the bicycle pedal adapter, in side view a concave section is defined between the front coupling part and the rear coupling part, the concave section having an apex between the bottom surface and a free end of the perpendicular part, wherein the concave section is configured to accommodate or abut a central cylindrical part of the bicycle pedal. Due to the concave section the foot support surface can be closer to the bicycle pedal.

In an embodiment of the bicycle pedal adapter, a notch of the front and rear restraining members adjacent the corresponding front and rear coupling part extends from the bottom surface to beyond the free end of the respective front and rear coupling parts. The notches improve the function of the restraining members.

In an embodiment of the bicycle pedal adapter, the left wall and right wall extend from the front end to the rear end, wherein adjacent the front coupling part and rear coupling part the walls increase in height and between the front coupling part and rear coupling part the walls gradually decrease in height, thereby defining the concave section.

In an embodiment, the bicycle pedal adapter comprises a front through hole extending through the top wall at a location directly above the front protruding part, and a rear through hole extending through the top wall at a location directly above the rear protruding part.

In an embodiment of the bicycle pedal adapter, the front and rear through hole are substantially rectangular, wherein in top view the through holes extend beyond all free sides of the corresponding protruding part.

The front and rear through holes allow the bicycle pedal adapter to be easily manufactured using injection moulding.

In an embodiment, the bicycle pedal adapter comprises a decoupling recess extending through the top wall, and through the front coupling part or rear coupling part, in particular through the base part and/or through the front and/or rear protruding part thereof, wherein the decoupling recess is configured to accommodate a decoupling tool for biasing a corresponding clamping member off the corresponding protruding part of the corresponding coupling. This way, the bicycle pedal adapter can be easily removed with the use of for example a screwdriver as decoupling tool.

In an embodiment of the bicycle pedal adapter, the front protruding part and/or the rear protruding part comprises a top sloping section. The top sloping section improves the hold of the bicycle pedal adapter on the bicycle adapter, as the slope of the top sloping section more closely resembled an inner side of the corresponding clamping member.

In an embodiment of the bicycle pedal adapter, the front protruding part and/or rear protruding part comprises a bottom sloping section. When clicking the bicycle pedal adapter on the bicycle pedal the bottom sloping section biases and guides the corresponding protruding part smoothly over the first or second clamping member of the bicycle pedal.

In an embodiment of the bicycle pedal adapter, the bicycle pedal adapter is an integral body of a single material or an integral body of a single material having only an anti-slip material on the foot support surface and no other materials. This allows the manufacturing to be as simple as possible.

In an embodiment, the single material is plastic, aluminium or titanium. These materials offer good strength and stiffness to weight ratios, resulting in a lightweight bicycle pedal adapter.

The bicycle pedal adapter may have no moving parts.

a. The bicycle pedal adapter may be rigid.

In an embodiment, the bicycle pedal adapter is when viewed in top view substantially symmetric about a vertical longitudinal midplane. Having symmetric, and thereby identical products is most efficient for manufacturing, for only one mould has to be made. It is also easier for the user, as the user does not have to worry about which bicycle pedal adapter matches the left or the right bicycle pedal.

In an embodiment of the bicycle pedal adapter, in bottom view the coupling is located in a centre of the bottom surface.

In an embodiment, the bicycle pedal adapter comprises a skirt extending from the bottom surface around the top wall.

In an embodiment of the bicycle pedal adapter, side skirt sections converge from the rear end to the front end, wherein in side view a bottom edge of the side skirt sections extends above said concave section at said concave section.

In an embodiment of the bicycle pedal adapter, the front protruding part has a width which is smaller than a width of the front base part.

In an embodiment of the bicycle pedal adapter, a length and a width of the front through hole are larger than a length and a width of the front protruding part.

In an embodiment of the bicycle pedal adapter, the front through hole extends from the front base part towards the front end.

In an embodiment of the bicycle pedal adapter, the rear protruding part has a width which is smaller than a width of the rear base part.

In an embodiment of the bicycle pedal adapter, a length and a width of the rear through hole are larger than a length and a width of the rear protruding part.

In an embodiment of the bicycle pedal adapter, the rear through hole extends from the rear base part towards the rear end.

In an embodiment of the bicycle pedal adapter, a width of the front base part is smaller than a width of the rear base part.

In an embodiment of the bicycle pedal adapter, a distance between the bottom surface and the front protruding part of rear protruding part is 4-5 mm.

In an embodiment of the bicycle pedal adapter, a width of the front base part is 15-20 mm, in particular 20 mm.

In an embodiment of the bicycle pedal adapter, a width of the rear base part is 20-25 mm.

In an embodiment of the bicycle pedal adapter, a length of the front protruding part and/or a length of the rear protruding part is 2-3 mm.

In an embodiment of the bicycle pedal adapter, a distance between the front base part and the rear base part is 20-25 mm.

In an embodiment of the bicycle pedal adapter, a distance between free ends of the front protruding part and the rear protruding part is 27-32 mm.

In an embodiment of the bicycle pedal adapter, the width of the front protruding part is 10-15 mm and wherein the width of the rear protruding part is 17-22 mm.

In an embodiment of the bicycle pedal adapter, a height of the front and rear base part perpendicular to the bottom surface is 9-11 mm.

In an embodiment of the bicycle pedal adapter, a distance between the front end and the front base part and a distance between the rear end and the rear base part is 25-30 mm.

In an embodiment of the bicycle pedal adapter, a length of the front through hole is 4-6 mm and a width of the front through hole is 14-16 mm.

In an embodiment of the bicycle pedal adapter, a length of the rear through hole is 4-6 mm and a width of the rear through hole is 20-25 mm.

In an embodiment of the bicycle pedal adapter, the length of the bicycle pedal adapter is 70-80 mm and the width of the bicycle pedal adapter is 70-80 mm.

In an embodiment of the bicycle pedal adapter, the height of the bicycle pedal adapter is 10-15 mm.

In an embodiment, the bicycle pedal adapter comprises at least one reinforcing rib integrally connected to the bottom surface.

In an embodiment of the bicycle pedal adapter, the at least one reinforcing rib extends from the front end to the rear end.

In an embodiment of the bicycle pedal adapter, wherein the foot support surface comprises a plurality of projections for grip.

In an embodiment of the bicycle pedal adapter, the front end of the bicycle pedal adapter is less wide than the rear end.

In an embodiment of the bicycle pedal adapter, the coupling comprises a single, integral base which comprises the front base part, rear base part and an intermediate base part which interconnects the front base part and rear base part.

In an embodiment of the bicycle pedal adapter, the intermediate part comprises the concave section.

In an embodiment, the bicycle pedal adapter comprises a left and right reinforcing rib which follow the contour of the base and have a smaller mutual distance between them at the front base part than at the rear base part.

Said left and right reinforcing rib provide the additional function of the restraining members.

The invention further relates to an assembly of the bicycle pedal adapter and a bicycle pedal having a cleat coupling, wherein the cleat coupling comprises a first clamping member which mates with the front coupling part and a second clamping member which mates with the rear coupling part.

In an embodiment of the assembly, a bottom sloping section of the front protruding part or rear protruding part is configured to bias the corresponding first or second clamping member in a direction away from the other clamping member when the bicycle pedal adapter is clicked onto the pedal.

In an embodiment of the assembly, the top wall of the bicycle pedal adapter is located above the first clamping member and above the second clamping member of the bicycle pedal.

In an embodiment of the assembly, the bicycle pedal adapter extends beyond a free end of the bicycle pedal. This has as an advantage that the bicycle pedal itself is better protected, in particular the free end thereof.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

For a more complete understanding of this disclosure and its advantages, reference is now made to the following description taken in conjunction with the accompanying drawings, in which like reference numerals represent like parts.

DETAILED DESCRIPTION OF THE FIGURES

Figure 1:
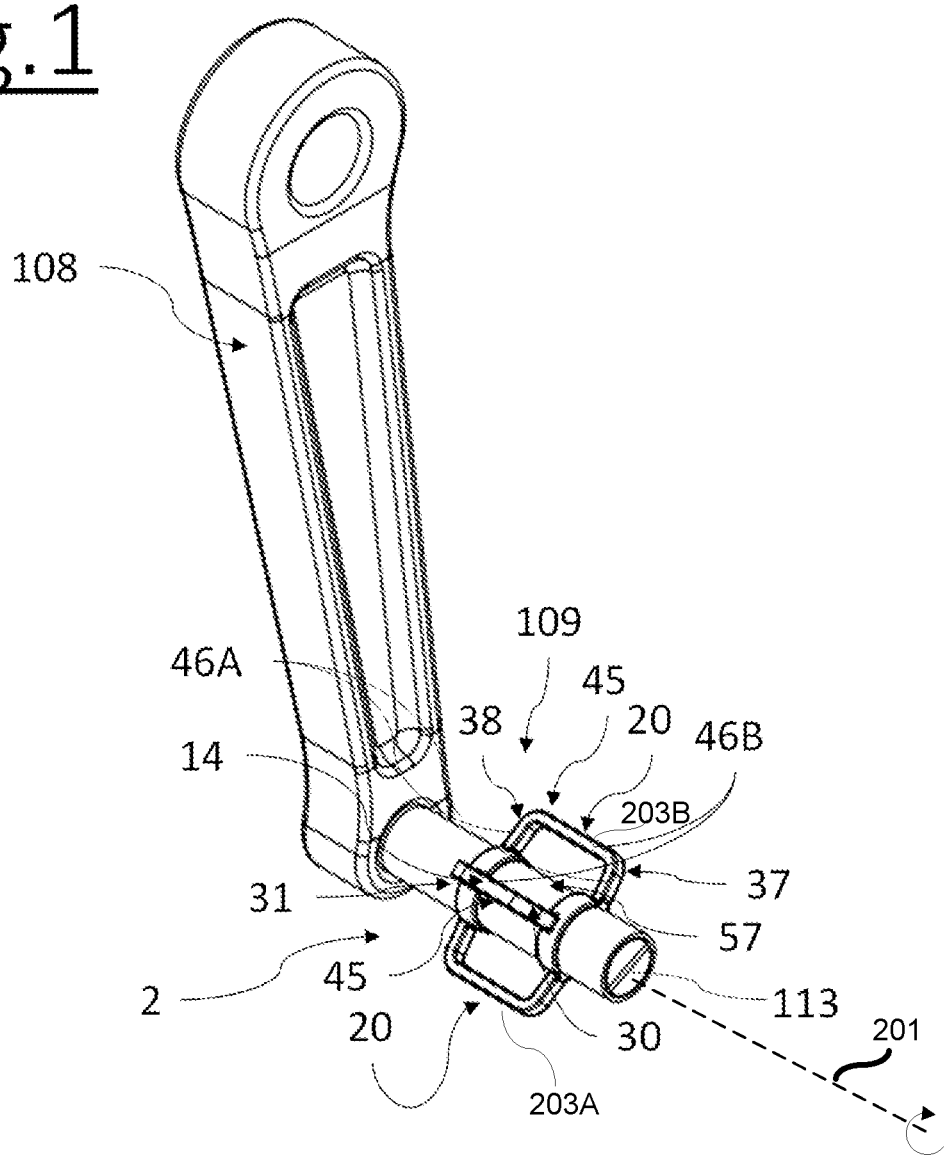
FIG. 1 schematically shows a perspective view of a bicycle pedal connected to a crank.

Turning to FIG. 1, a crank 108 with a bicycle pedal 2 is shown. The bicycle pedal 2 has a cleat coupling 109. The cleat coupling 109 has a first clamping member 14 and a second clamping member 20. In the shown embodiment the bicycle pedal 2 has two first clamping members 14 and two second clamping members 20. The clamping members 14, 20 are provided at an angle of substantially 90 degrees relative to each other and extend outwards from a substantially cylindrical main body 110. On the outside 111 of the cylindrical main body 110 and between the clamping members 14, 20 a helical torsion spring (not shown) is provided. The first clamping member 14 can be pivoted about the cylindrical main body 110 towards, or away from the second clamping member 20. The helical torsion spring biases the first and second clamping members 14, 20 towards said 90 degrees configuration.

Figure 2:
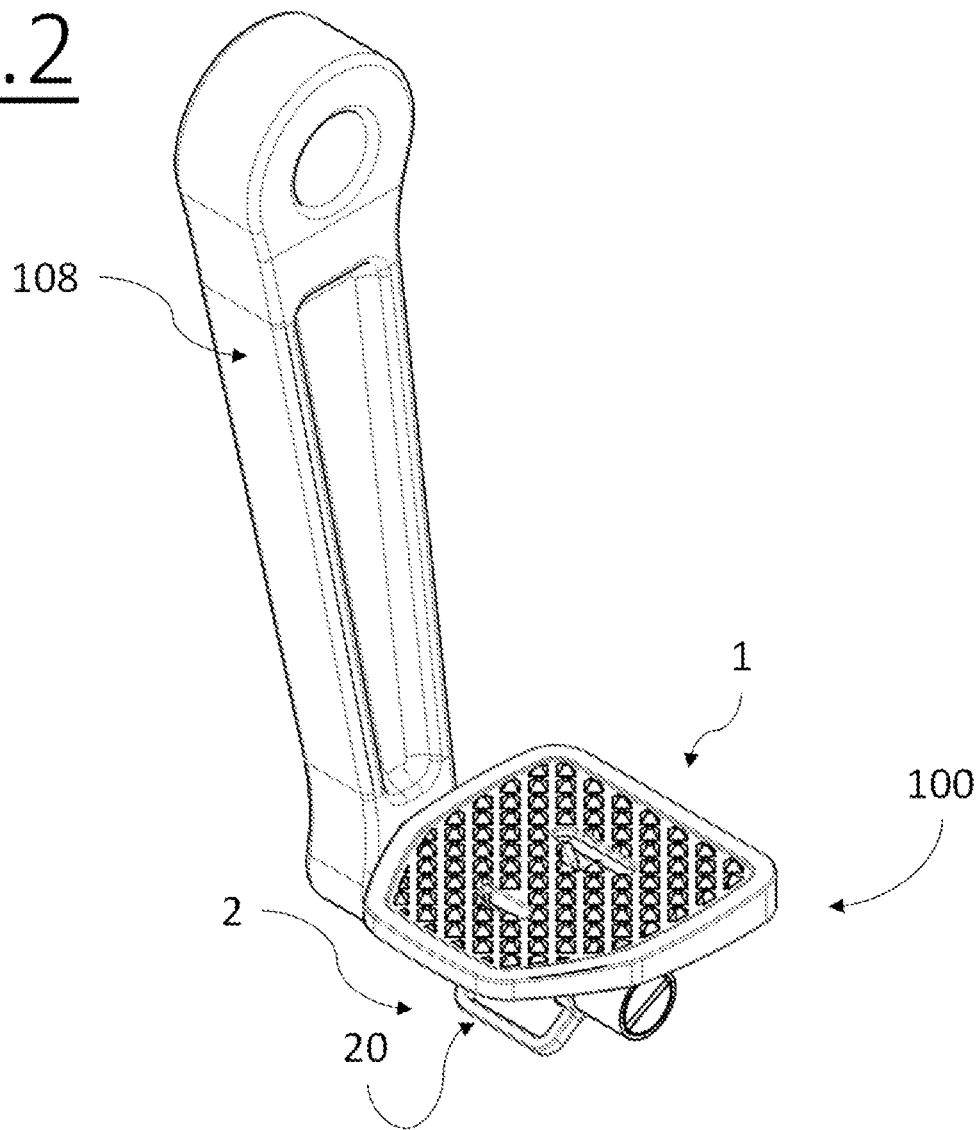
FIG. 2 schematically shows a perspective view of an embodiment of an assembly according to the invention of a bicycle pedal adapter coupled to the bicycle pedal and crank of FIG. 1.
Figure 3:
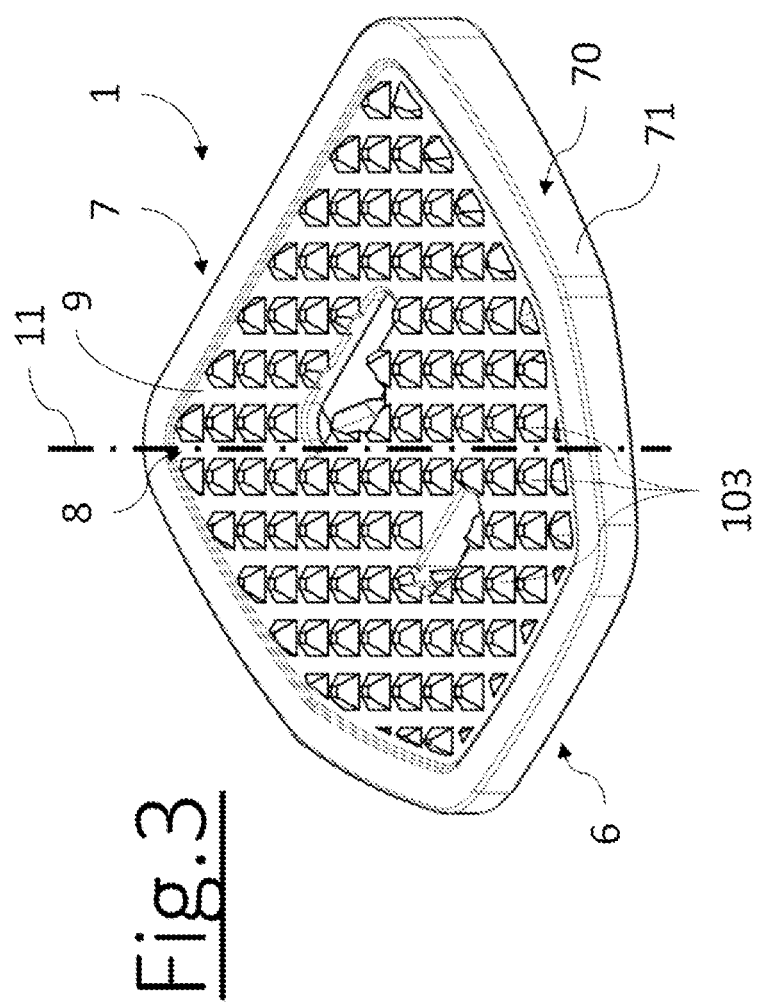
FIG. 3 schematically shows a perspective top view of an embodiment of a bicycle pedal adapter according to the invention.
Figure 4:
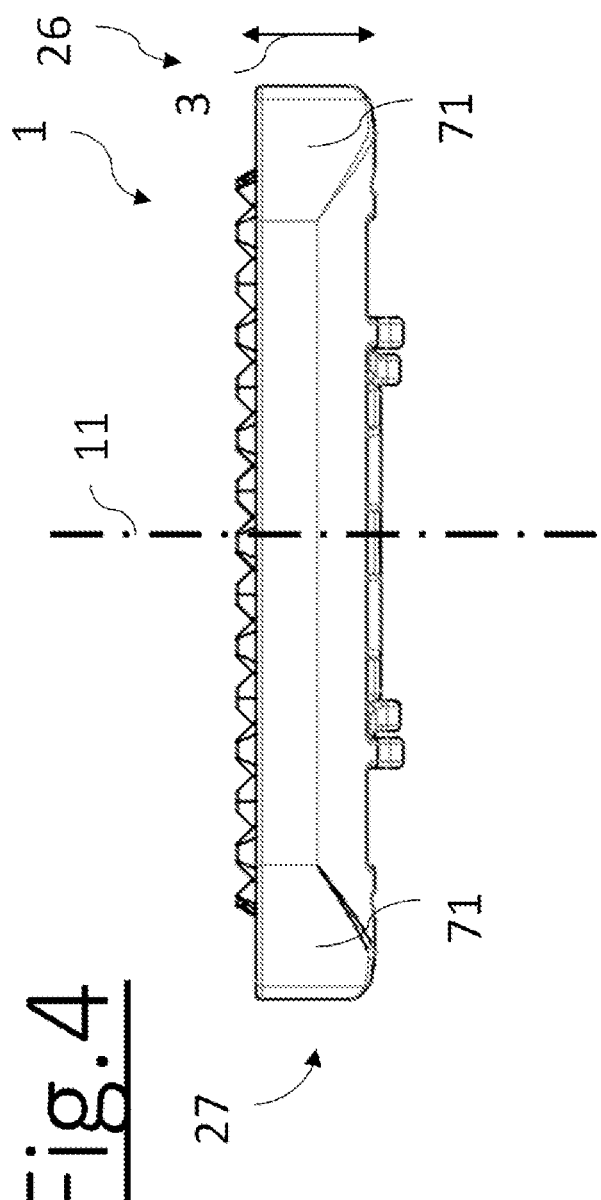
FIG. 4 schematically shows a rear view of the embodiment of FIG. 3.
Figure 5:
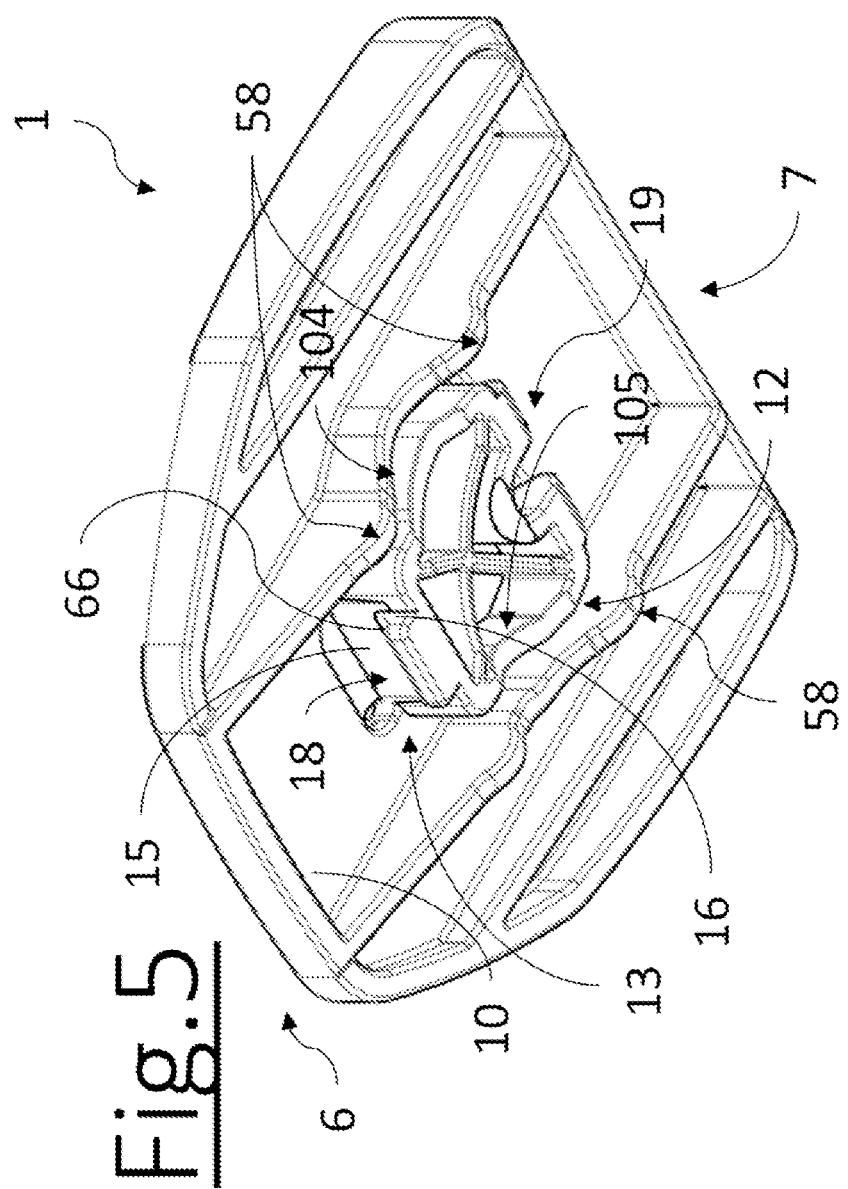
FIG. 5 schematically shows a perspective bottom view of the embodiment of FIG. 3.
Figure 6:
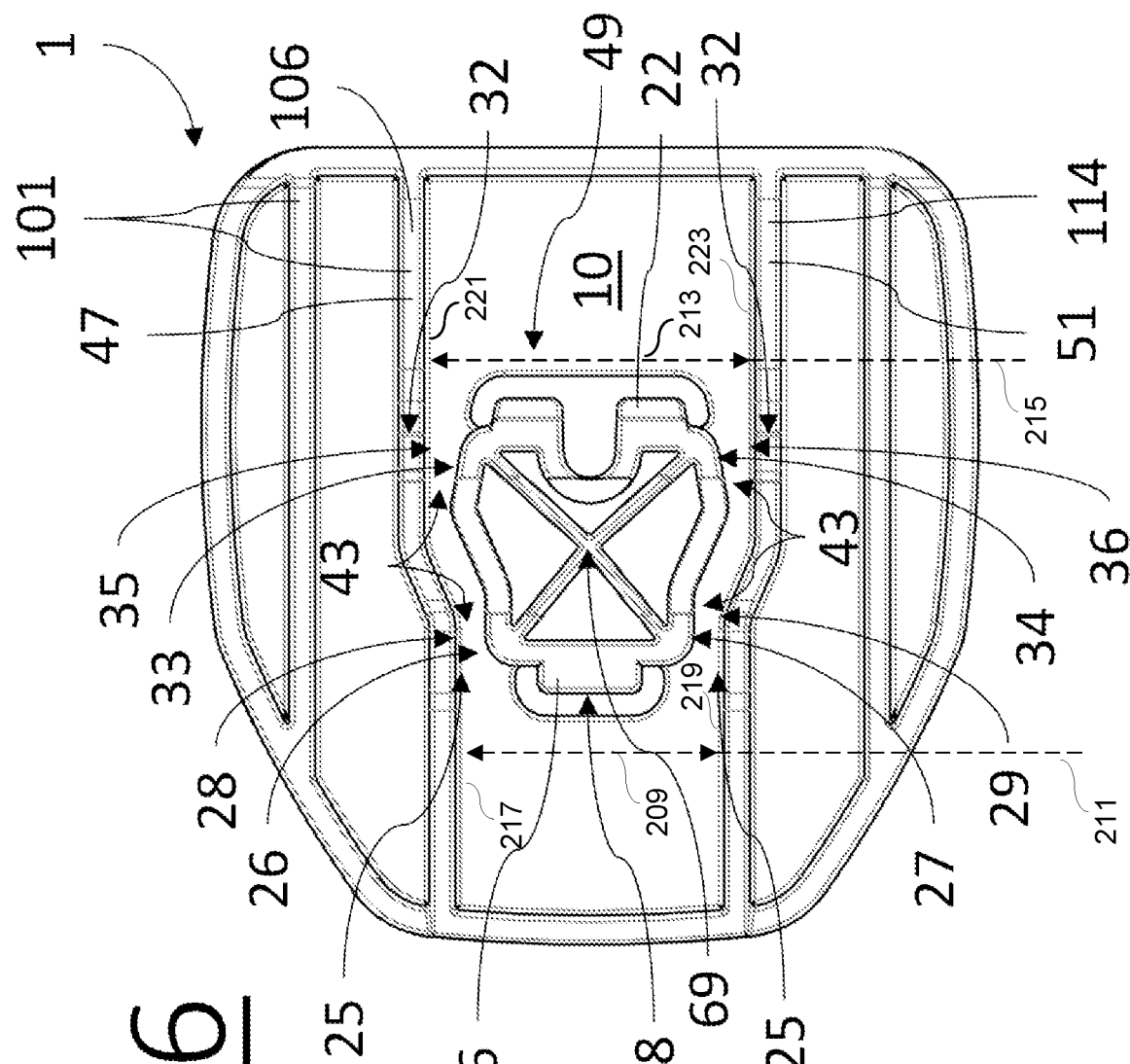
FIG. 6 schematically shows a bottom view of the embodiment of FIG. 3.

FIG. 2 (and FIG. 15) show an assembly according to a first aspect of the invention. The assembly comprises the crank 108 with bicycle pedal 2 of FIG. 1 and a bicycle pedal adapter 1 according to a second aspect of the invention. Bicycle pedal adapter 1 comprises a first coupling, which, in the non-limiting example of FIG. 2 is a front coupling part 13. First coupling part 13 is coupled to a first clamping member 14 of the bicycle pedal. According to some embodiments, first coupling part 13 extends in a first direction 205 perpendicular to an axis of rotation 201 of bicycle pedal 2. Bicycle pedal adapter 1 further comprises a second coupling, which, in the non-limiting example of FIG. 2 is a rear coupling part 19. Second coupling part 19 is coupled to a second clamping member 20. According to some embodiments, second coupling part 19 extends in a second direction 207 perpendicular to the axis of rotation 201 of bicycle pedal 2.

The terms front and rear are chosen for convenience. During use the bicycle pedal may be rotated 90 degrees before coupling the bicycle pedal adapter thereto, due to which the first and second clamping member 14, 20 are reversed. The front coupling member will still be coupled to the first clamping member 14 and the rear coupling member is then coupled to the second clamping member 20.

Turning to FIGS. 3-11, different schematic views of an embodiment of the bicycle pedal adapter 1 according to the invention are shown.

The bicycle pedal adapter 1 is configured to be clicked onto a bicycle pedal 2 which is intended and constructed to be used for a bicycle shoe having a cleat. The bicycle pedal adapter 1 is configured to convert the bicycle pedal 2 to a bicycle pedal 2 suitable to be used with a normal shoe without a cleat. The bicycle adapter 1 does not have a toe-clip and the bicycle adapter 1 is free of a connecting member for connecting a toe-clip thereto.

Figure 18:
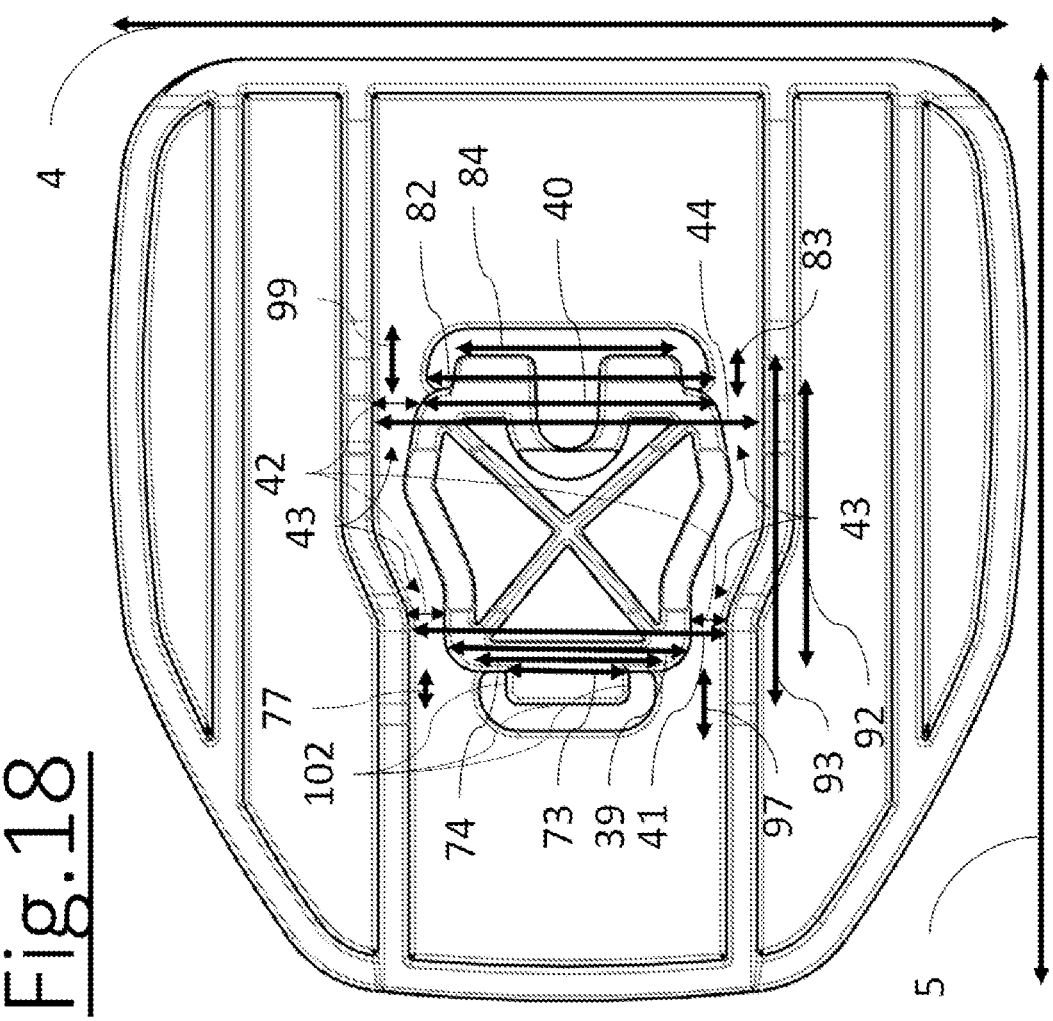
FIG. 18 schematically shows dimensions of the embodiment of FIG. 3.

The bicycle pedal adapter 1 is flat and has a height 3, a width 4 and a length 5 (FIG. 18). The width is more than four times the height and the length is more than five times the height.

The bicycle pedal adapter 1 has a front end 6 and a rear end 7 and comprises a top wall 8 defined by the width 4 and length 5. The top wall 8 has a first surface which is a foot support surface 9 which faces upwards, and a second surface which is a bottom surface 10 opposite the foot support surface 9. A central axis 11 extends perpendicular to the foot support surface 9.

In a side view, the main body has a substantially flat foot support surface 9.

The bicycle pedal adapter 1 is an integral body of a single material. The adapter 1 may also be an integral body of a single material having only an anti-slip material on the foot support surface 9 and no other materials.

In the shown embodiment the foot support surface 9 comprises a plurality of projections 103 for grip. The plurality of projections 103 are distributed evenly on the foot support surface 9.

The top wall 8 may also have small holes in it between for example said projections 103. Said small holes are not shown in the figures.

The bicycle pedal adapter 1 comprises a coupling 12 for connecting the pedal adapter 1 to the bicycle pedal 2. The coupling 12 comprises a first coupling (for example, front coupling part 13) and a second coupling (for example, rear coupling part 19).

The front coupling part 13 is provided between the front end 6 and the rear end 7. Said front coupling part 13 is configured to mate with the first clamping member 14 of the bicycle pedal 2, wherein bicycle pedal 2 comprises a clamping mechanism 200 having a plurality of clamping members (for example, first clamping member 14) for multi-sided cleat engagement. Clamping mechanism 200 is rotatably attached to axle 113 and is free to rotate around an axis of rotation 201 of clipless pedal 2. The front coupling part 13 has a front base part 15 extending downward from the bottom surface 10 and a first protrusion (for example, front protruding part 16) extending in a forward direction (for example, first direction 205) from the front base part 15.

The front base part 15, the front protruding part 16 and the bottom surface 10 define a front clamping member cavity 18.

The rear coupling part 19 is provided between the front coupling part 13 and the rear end 7. Said rear coupling part 19 is configured to mate with a second clamping member 20 of the bicycle pedal 2. The rear coupling part 19 has a rear base part 21 extending downward from the bottom surface 10 and a second protrusion (for example, rear protruding part 22) extending in a rearward direction (for example, second direction 207) 23 from the rear base part 21.

The rear base part 21, the rear protruding part 22 and the bottom surface 10 define a rear clamping member cavity 24.

A thickness of one or both of the protruding parts decreases from the surface of the base part towards the respective end of the protruding part.

The front protruding part 16 comprises a top sloping section 66. The top sloping section 66 is configured to match an inner side of the first clamping member 14 such that the contact area between the front protruding part 16 and the first clamping member 14 is improved.

In the shown embodiment the rear protruding part 22 comprises a top sloping section 66. The top sloping section 66 of the rear protruding part 22 is configured to match an inner side of the second clamping member 20 such that the contact area between the rear protruding part 22 and the second clamping member 20 is improved.

Also, the top sloping section 66 facilitates easier decoupling 12 when the first and second clamping member 20 are moved away from each other. The top sloping section 66 allows the bicycle pedal adapter 1 to decoupling 12 in a more sliding fashion compared to for example a top section which is parallel to the bottom surface 10.

The front protruding part 16 and/or rear protruding part 22 comprises a bottom sloping section 67.

The bottom sloping section 67 is configured to bias the corresponding first or second clamping member 20 in a direction away from the other clamping member when the bicycle pedal adapter 1 is clicked onto the pedal 2. In principle only one of the front and rear protruding parts has to have a bottom slope section in order to provide said biasing of the corresponding clamping member.

The bottom sloping section 67 guides the corresponding protruding part of the bicycle pedal adapter 1 smoothly over the first or second clamping member 20 of the bicycle pedal 2.

The front and rear protruding parts may also have a bottom section and/or top section which are flat, i.e. parallel to the bottom surface 10.

The coupling 12 comprises a single, integral base 104 which comprises the front base part 15, rear base part 21 and an intermediate base part 105 which interconnects the front base part 15 and rear base part 21.

In bottom view the coupling 12 is located in a centre 69 of the bottom surface 10. In particular the coupling 12 is located in the middle between the front end 6 and the rear end 7.

A front restraining member 25 is provided at a left side and a right side of the front coupling part 13. The front restraining member 25 has a front left face 28 and a front right face 29 configured to abut respectively a left outer side 30 and a right outer side 31 of the first clamping member 14 when coupled with the bicycle pedal 2.

A rear restraining member 32 is provided at a left side and a right side of the rear coupling part 19, the rear restraining member 32 comprising a rear left face 35 and a rear right face 36 configured to abut respectively a left outer side 37 and a right outer side 38 of the second clamping member 20 when coupled with the bicycle pedal 2.

The front restraining member 25 is provided at a lateral distance 32, i.e. a distance perpendicular to the longitudinal axis of the bicycle pedal adapter, from the left side and right side of the front coupling part 13, as shown in FIGS. 5, 6, 11 and 18.

Said figures also show the rear restraining member 32 being provided at a lateral distance 42 from the left side and right side of the rear coupling part 19, in particular FIG. 18.

A gap 43 is defined between the respective left side and right side of the front coupling part and the front restraining member 25. Said gap 43 is also provided between the respective left side and right side of the rear coupling part 19 and the rear restraining member 32.

Figure 15:
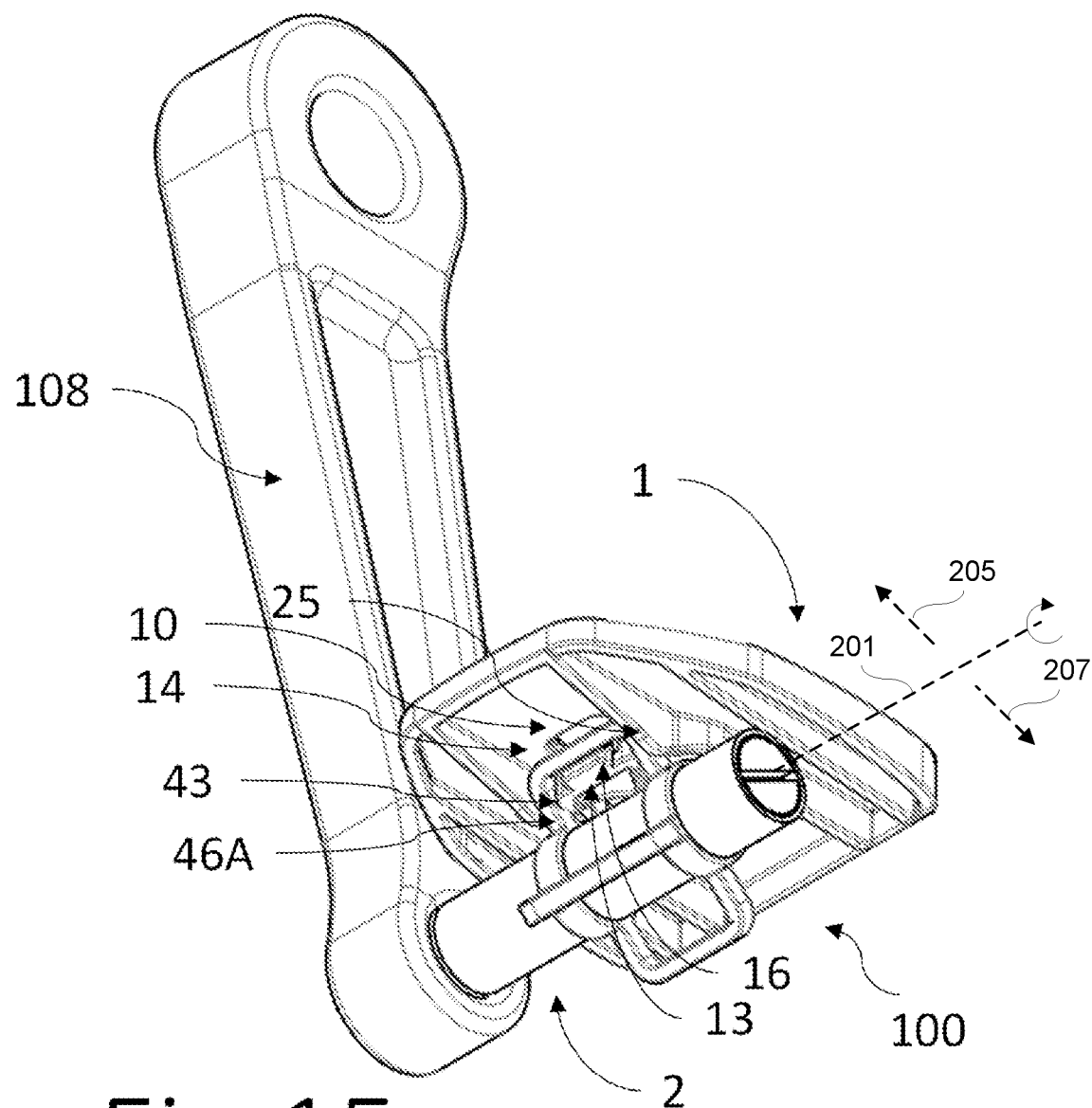
FIG. 15 schematically shows a perspective bottom view of the embodiment of FIG. 1.
Figure 16:
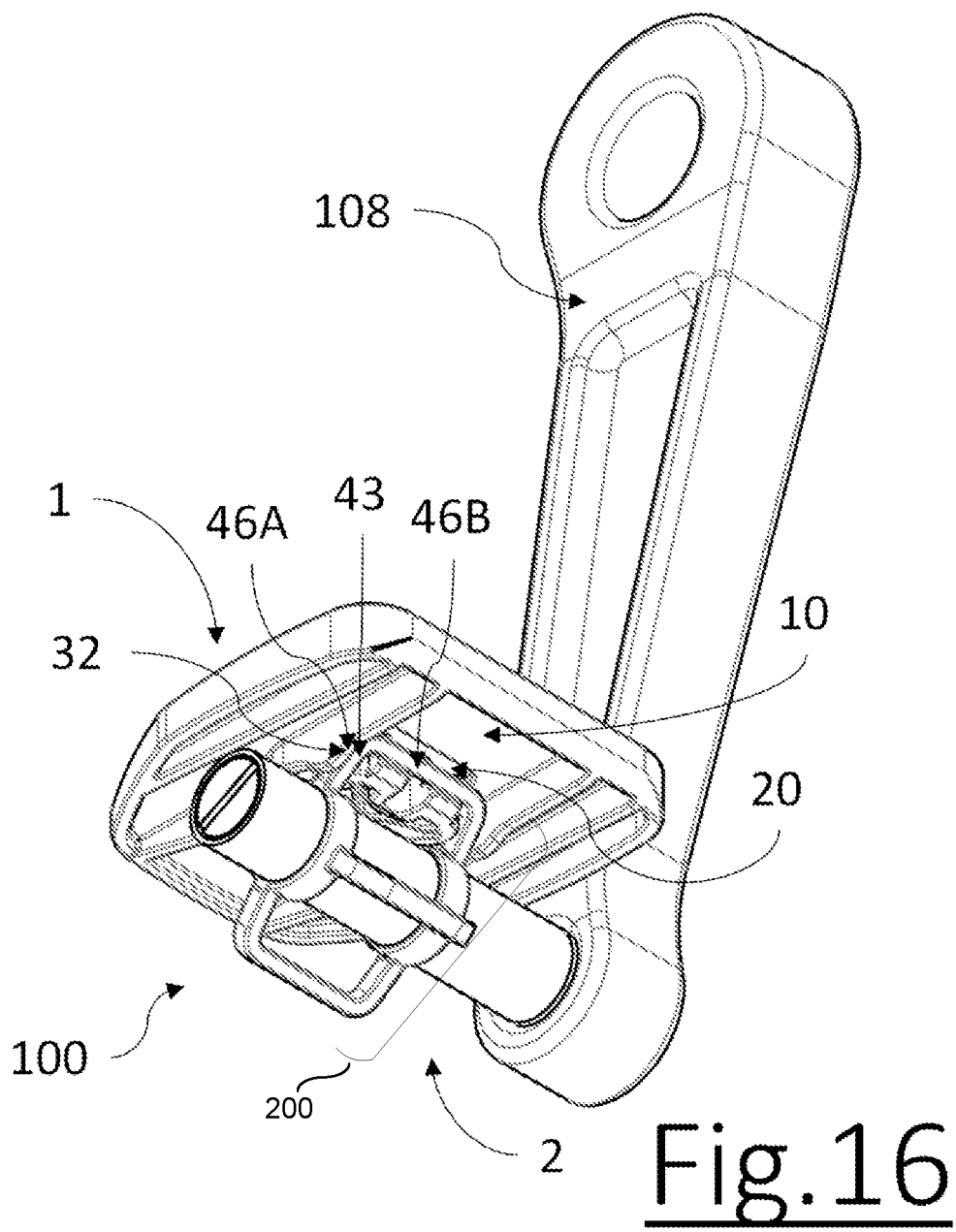
FIG. 16 schematically shows a perspective bottom view of the embodiment of FIG. 1.
Figure 17:
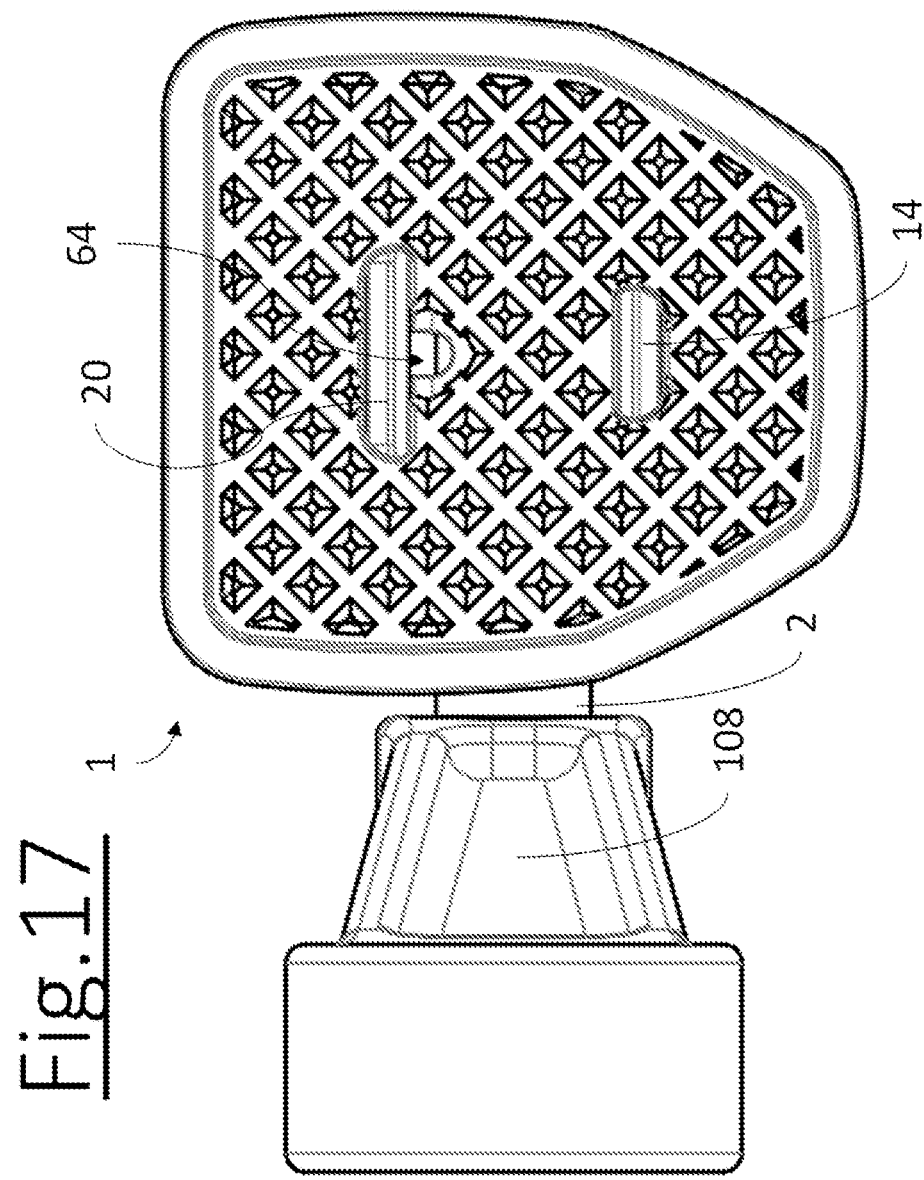
FIG. 17 schematically shows a top view of the embodiment of FIG. 1.

As shown in FIGS. 15 and 16 the front restraining member 25 and rear restraining member 32 are configured to enclose the respective first clamping member 14 and second clamping member 20 at the outer sides 30, 31, 37, 38 (see FIG. 1) thereof.

The first clamping member 14 and the second clamping member 20 comprise a bracket 45 comprising two laterally extending sections 46A connected to each other via an axially extending section 46B. The laterally extending sections 46A are configured to be located in the gap 43 defined between the respective outer side of the coupling part 14, 20 and the respective restraining member 25, 32.

The axially extending section 46B of the first clamping member 14 is configured to be located between the bottom surface 10 and the front coupling part 13, in particular the front protruding part 16 thereof, see for example FIG. 15.

The axially extending section 46B of the second clamping member 20 is configured to be located between the bottom surface 10 and the rear coupling part 19, in particular the front protruding part 16 thereof, see for example FIG. 15.

The restraining members are configured to prevent rotation of the bicycle pedal adapter 1 around the central axis 11 thereof during use when the bicycle pedal adapter 1 is coupled with the bicycle pedal 2.

The bicycle pedal adapter 1 is configured to be clicked onto the bicycle pedal 2 and to be uncoupled from the bicycle pedal 2.

A left wall 47 extends between a front end 6 of the of the front coupling part 13 and a rear end 7 of the rear coupling part 19 at a left side of the front and rear coupling part 19. A right wall 51 extends between a front end 6 of the front coupling part 13 and a rear end 7 of the rear coupling part 19 at a right side of the front and rear coupling part 19. The left and right wall 51 define the front and rear restraining members. As shown in the illustrative example of FIG. 18, the left and right wall (or first face and second face of the front restraining member) is disposed at a third distance 42 from the first coupling along a line parallel to an axis of rotation of the pedal.

The bicycle pedal adapter 1 comprises at least one reinforcing rib 101 integrally connected to the bottom surface 10. In the shown embodiment there are four reinforcing ribs, see FIG. 6.

The reinforcing ribs 101 extend from the front end 6 to the rear end 7.

A left reinforcing rib 106 and a right reinforcing rib 114 follow the contour of the base of the coupling 12 and have a smaller mutual distance between them at the front base part 15 than at the rear base part 21.

The front and rear restraining members adjacent the corresponding front and rear coupling part 19 comprise notches 58 which extend from the bottom surface 10 to beyond the free end of the respective front and rear coupling parts.

In the shown embodiment, the notches 58 are integrated in the left and right reinforcing rib 106, 114, or left and right wall 47, 51.

Figure 7:
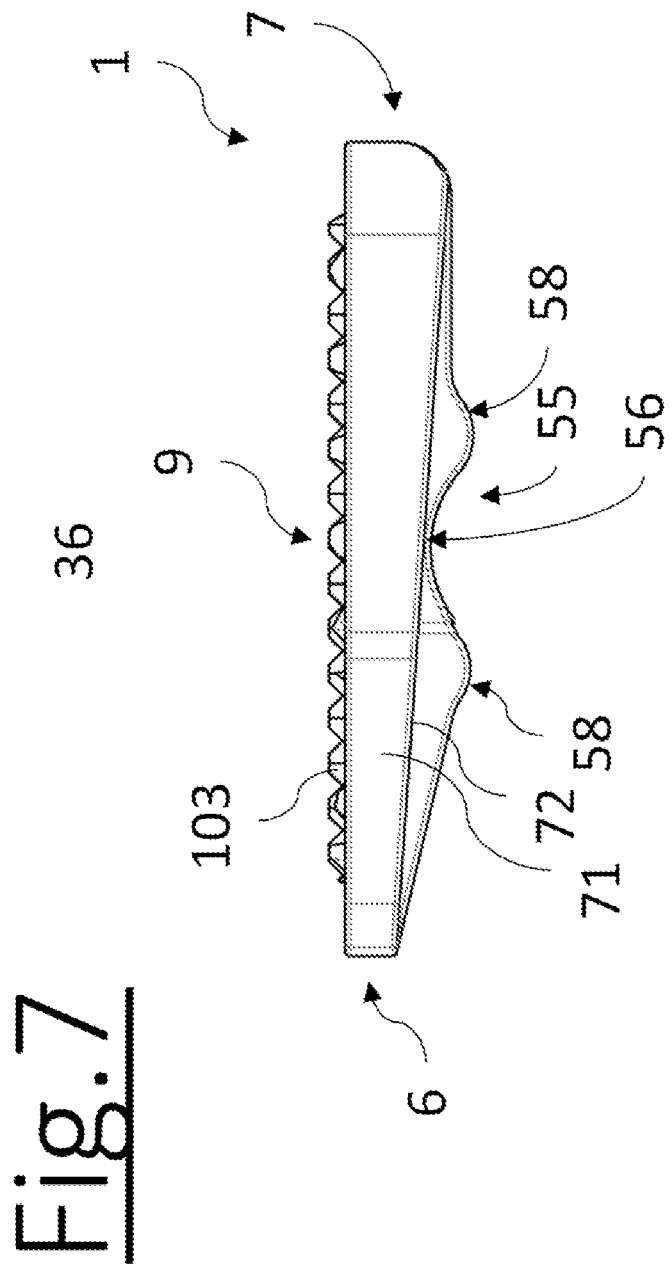
FIG. 7 schematically shows a side view of the embodiment of FIG. 3.
Figure 8:
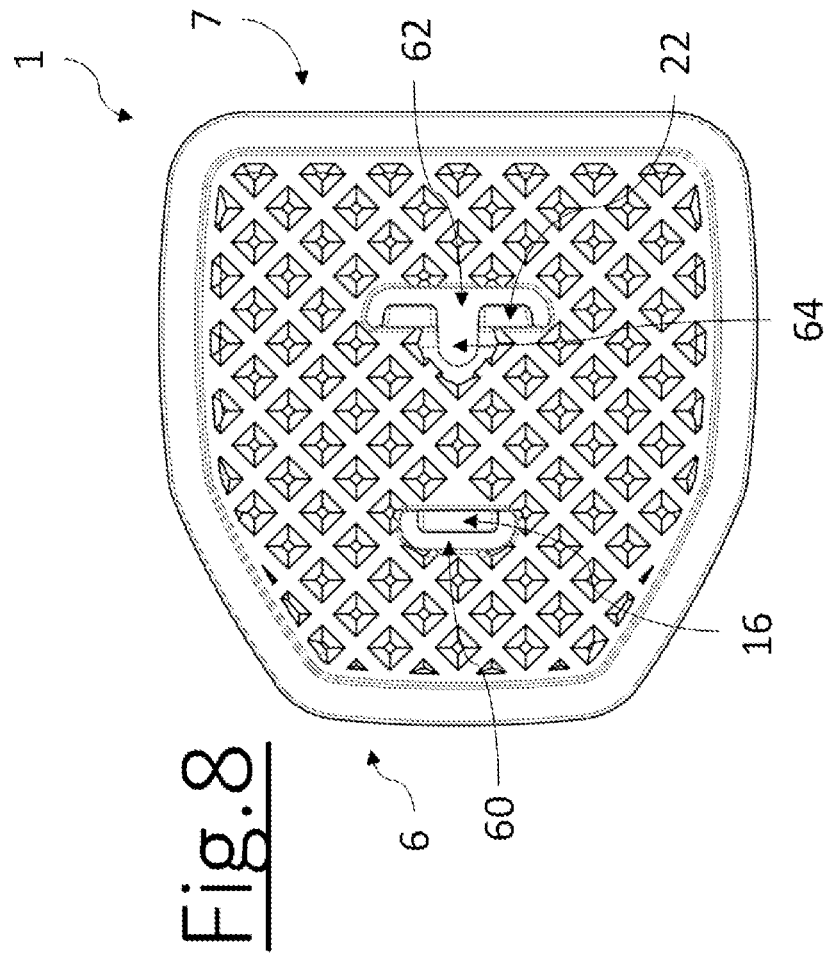
FIG. 8 schematically shows a top view of the embodiment of FIG. 3.
Figure 9:
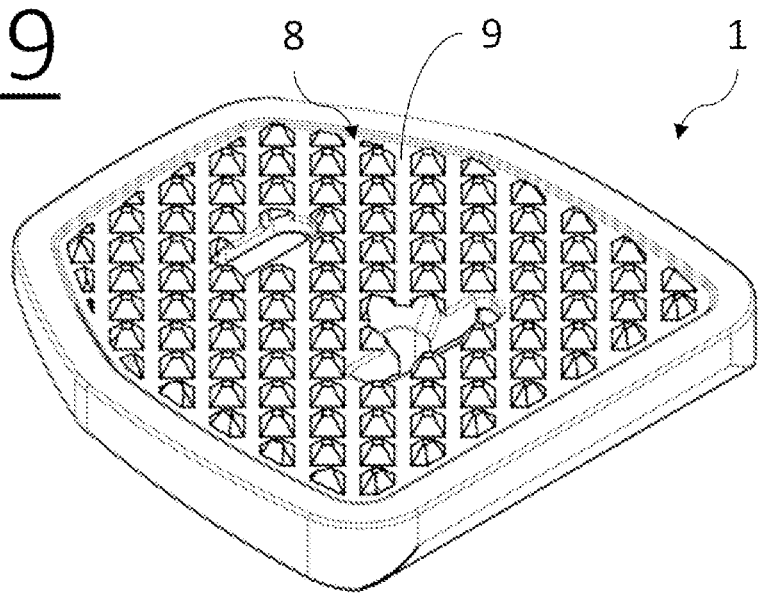
FIG. 9 schematically shows a perspective top view of the embodiment of FIG. 3.
Figure 10:
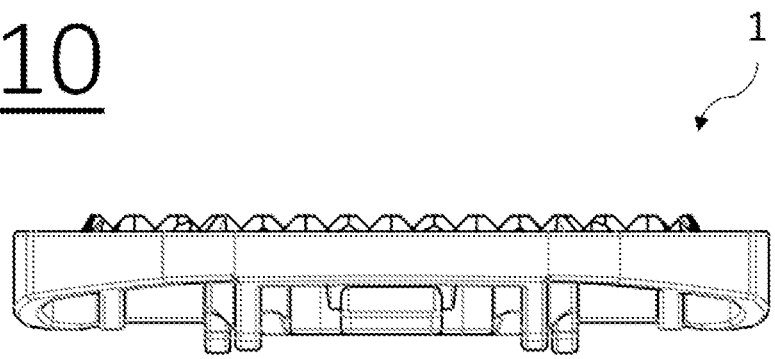
FIG. 10 schematically shows a front view of the embodiment of FIG. 3.
Figure 11:
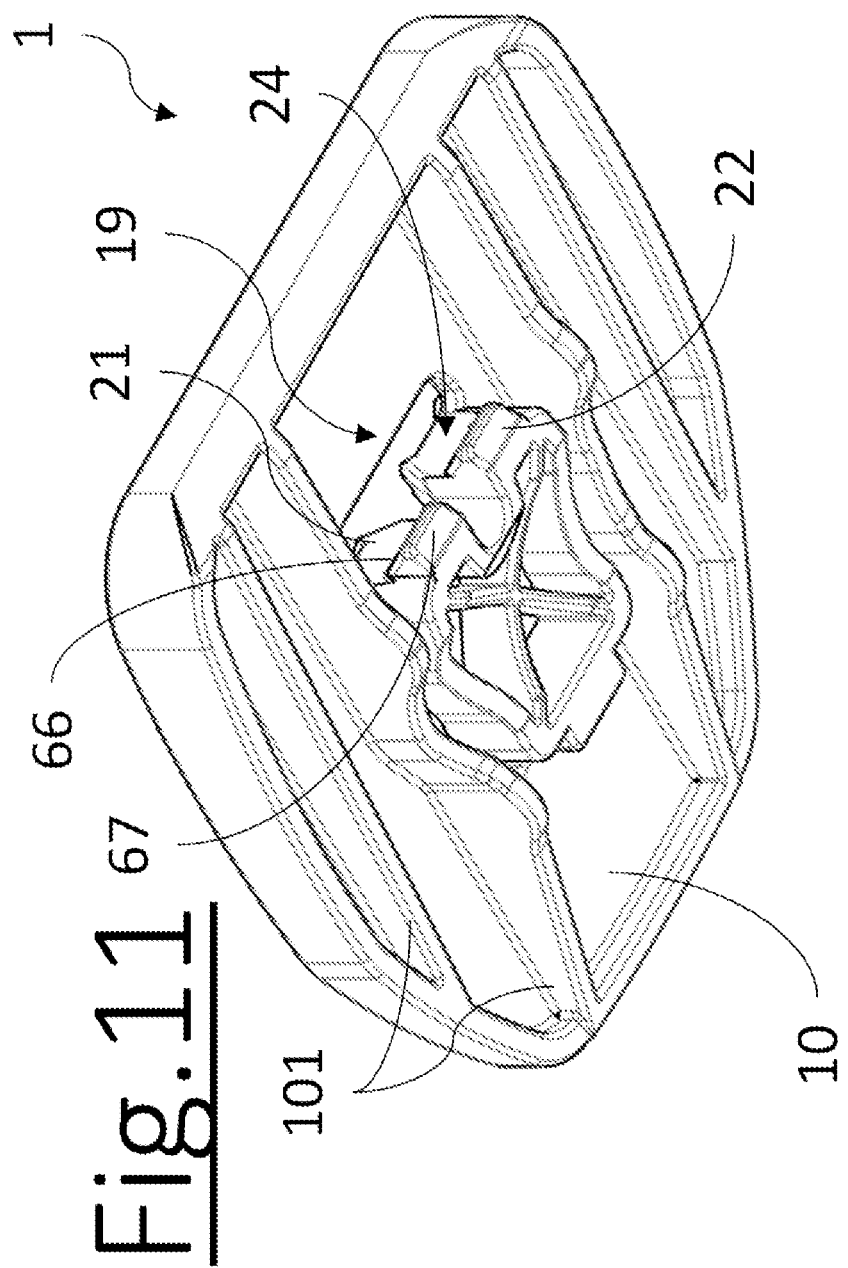
FIG. 11 schematically shows a perspective bottom view of the embodiment of FIG. 3.
Figure 12:
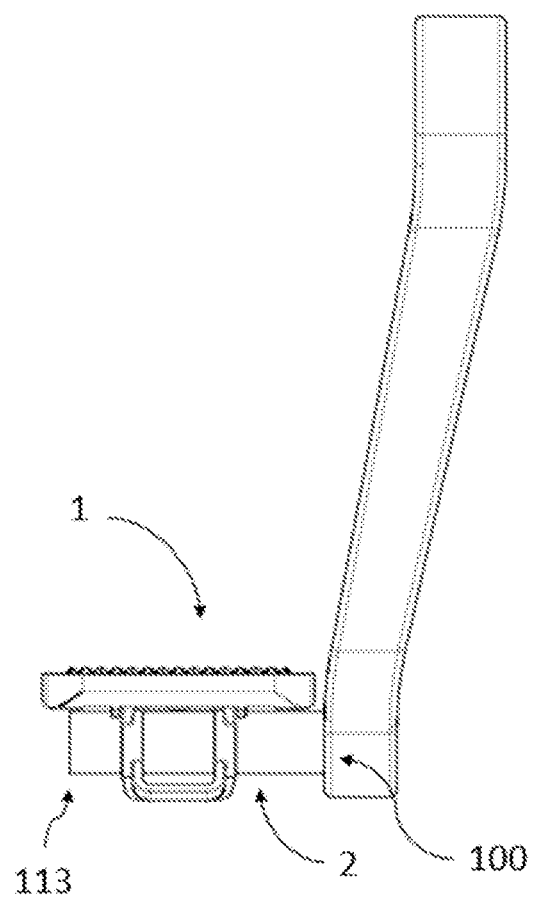
FIG. 12 schematically shows a rear view of the embodiment of FIG. 1.
Figure 13:
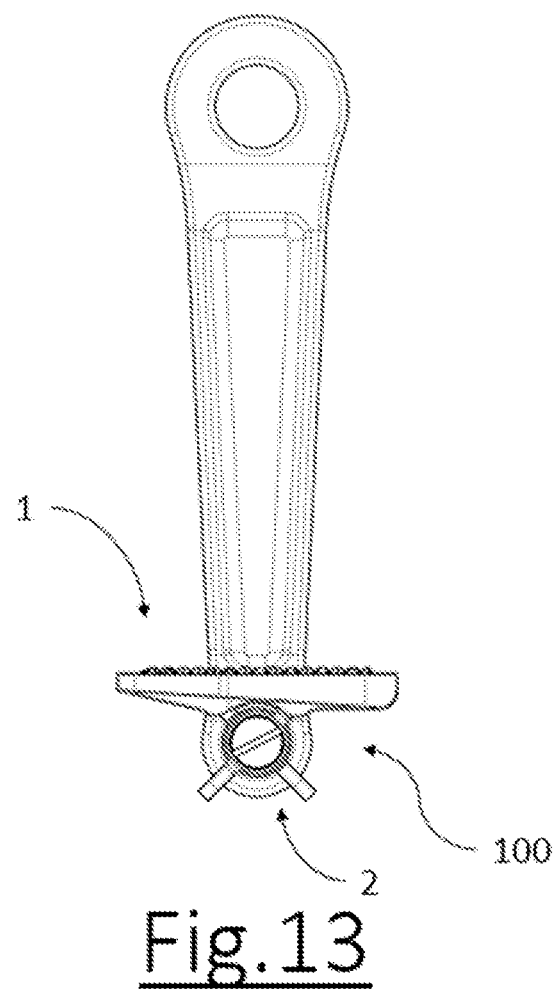
FIG. 13 schematically shows a side view of the embodiment of FIG. 1.
Figure 14:
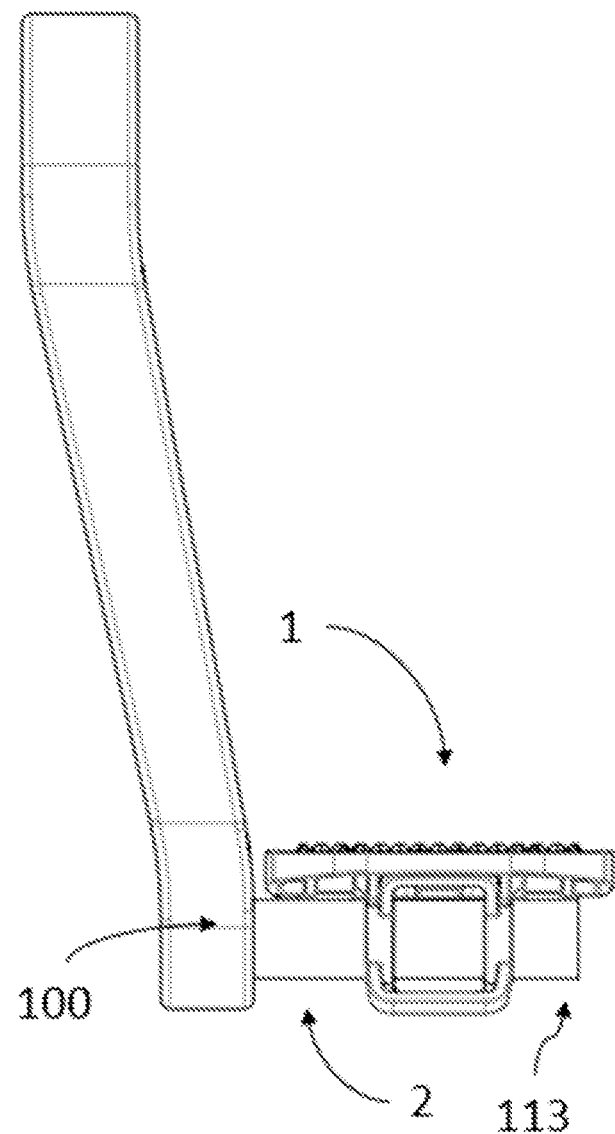
FIG. 14 schematically shows a front view of the embodiment of FIG. 1.

In the side view of FIG. 7 a concave section 55 is defined between the front coupling part 13 and the rear coupling part 19. The concave section 55 has an apex 56 between the bottom surface 10 and a free end of the base part. The concave section 55 is configured to accommodate or abut a central cylindrical part 57 of the bicycle pedal 2.

The intermediate part of the single, integral base 104 comprises the concave section 55.

The left wall 47 and right wall 51 extend from the front end 6 to the rear end 7 of the bicycle pedal adapter 1. Adjacent the front coupling part 13 and rear coupling part 19 the walls increase in height and between the front coupling part 13 and rear coupling part 19 the walls gradually decrease in height, thereby defining the concave section 55.

The bicycle pedal adapter 1 has a front through hole 60 extending through the top wall 8 at a location directly above the front protruding part 16. A rear through hole 62 extends through the top wall 8 at a location directly above the rear protruding part 22.

The front through hole 60 extends from the front base part 15 towards the front end 6.

The front and rear through hole 62 are substantially rectangular, wherein in top view the through holes extend beyond all free sides 102 of the corresponding protruding part.

A decoupling recess 64 extends through the top wall 8, and through the rear coupling part 19, in particular through the base part and/or through the front and/or rear protruding part 22 thereof, wherein the decoupling recess 64 is configured to accommodate a decoupling 12 tool for biasing a corresponding clamping member off the corresponding protruding part of the corresponding coupling 12.

A length 97 and a width 74 of the front through hole 60 are larger than a length 77 and a width 73 of the front protruding part 16.

The length 97 of the front through hole 60 is 4-6 mm and the width 74 of the front through hole 60 is 14-16 mm.

A length 99 and a width 82 of the rear through hole 62 are larger than a length and a width of the rear protruding part 22.

The length 99 of the rear through hole 62 is 4-6 mm and the width 82 of the rear through hole 62 is 20-25 mm.

The rear through hole 62 extends from the rear base part 21 towards the rear end 7.

The bicycle pedal adapter 1 has a skirt 70 extending from the bottom surface 10 around the top wall 8.

The skirt 70 has side skirt sections 71, which converge from the rear end 7 to the front end 6. In a side view, a bottom edge 72 of the side skirt sections 71 extends above said concave section 55 at said concave section 55.

The bicycle pedal adapter 1 has a vertical left side and a vertical right side. In the shown embodiment the skirt 70 is vertical, so all sides are in fact vertical.

The bicycle pedal adapter 1 may have the following dimensions.

A first width 39 of the front coupling part 13 is smaller than a second width 40 of the rear coupling part 19.

A first distance 41 between a left side and a right side of the front restraining member 25 is smaller than a second distance 44 between a left side and a right side of the rear restraining member 32.

The front protruding part 16 has a width 73 which is smaller than a width 74 of the front base part 15.

The rear protruding part 22 has a width 84 which is smaller than a width 40 of the rear base part 21.

The width 74 of the front base part 15 is smaller than the width 40 of the rear base part 21.

A distance between the bottom surface 10 and the front protruding part 16 of rear protruding part 22 is 4-5 mm.

The width 74 of the front base part 15 is 10-20 mm.

The width 40 of the rear base part 21 is 20-25 mm.

A length 77 of the front protruding part 16 and/or a length 83 of the rear protruding part 22 is 2-3 mm.

A distance 92 between the front base part 15 and the rear base part 21 is 20-25 mm.

A distance 93 between free ends of the front protruding part 16 and the rear protruding part 22 is 27-32 mm.

The width 73 of the front protruding part 16 is 10-15 mm and the width 84 of the rear protruding part 22 is 17-22 mm.

A height of the front and rear base part 21 perpendicular to the bottom surface 10 is 9-11 mm.

A distance between the front end 6 and the front base part 15 and a distance between the rear end 7 and the rear base part 21 is 25-30 mm.

The length of the bicycle pedal adapter 1 is 70-80 mm and the width of the bicycle pedal adapter 1 is 70-80 mm.

The height of the bicycle pedal adapter 1 is less than 15 mm.

The front end 6 of the bicycle pedal adapter 1 is less wide than the rear end 7.

Turning to FIGS. 12-16, different views of the assembly according to the invention are shown.

The bicycle pedal adapter 1 extends over the front and rear clamping member of the bicycle pedal 2.

When the bicycle pedal adapter 1 is coupled to the bicycle pedal 2 the top wall 8 of the bicycle pedal adapter 1 is located above the first clamping member 14 and above the second clamping member 20 of the bicycle pedal 2.

In the assembled state with the bicycle pedal 2 the bicycle pedal adapter 1 extends beyond a free end of the bicycle pedal 2. This can be best seen in FIGS. 12 and 14-16. This way, the bicycle pedal 2 is better protected.

In a side view, the foot support surface 9 is located less than 5 mm above a plane defined by the front and rear clamping members.

In a side view the bicycle pedal adapter 1 does not engage a bottom side of the bicycle pedal 2.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The present invention further relates to the following numbered clauses:

Bicycle pedal adapter configured to be clicked onto a bicycle pedal which is intended and constructed to be used for a bicycle shoe having a cleat, wherein the bicycle pedal adapter is configured to convert the bicycle pedal to a bicycle pedal suitable to be used with a normal shoe without a cleat, wherein the bicycle adapter does not comprise a toe-clip, and wherein the bicycle adapter is free of a connecting member for connecting a toe-clip thereto, wherein the bicycle pedal adapter is flat, in particular having a height, a width and a length, wherein the width is more than four times the height and wherein the length is more than five times the height, and a. wherein the pedal adapter has a front end and a rear end, the bicycle pedal adapter further comprising:

b. a top wall defined by the width and length, the top wall comprising a foot support surface which faces upwards, and a bottom surface opposite the foot support surface, c. a central axis perpendicular to the foot support surface, d. a coupling for connecting the pedal adapter to the bicycle pedal, the coupling comprising:

i. a front coupling part provided between the front end and the rear end, the front coupling part being configured to mate with a first clamping member of the bicycle pedal, ii. a rear coupling part provided between the front coupling part and the rear end, the rear coupling part being configured to mate with a second clamping member of the bicycle pedal, e. a front restraining member provided at a left side and a right side of the front coupling part. Referring to the non-limiting example of FIG. 15, there is a space, or gap between the front restraining member and the front coupling part to accommodate a portion 46A of a first clamping mechanism 203A, wherein portion 46A of the first clamping mechanism 203A is substantially perpendicular to the axis of rotation 201 of the pedal on crank 108. As shown in FIG. 15, portion 46A (which is perpendicular to axis of rotation 201) sits in the above-described space between the front restraining member and the front coupling part.

f. a rear restraining member provided at a left side and a right side of the rear coupling part. Referring to the non-limiting example of FIG. 15, there is a space, or gap between the front restraining member and the front coupling part to accommodate a portion 46B of a second clamping mechanism 203B, wherein portion 46B of the second clamping mechanism 203B is substantially perpendicular to the axis of rotation 201 of the pedal on crank 108. As shown in FIG. 15, portion 46B (which is perpendicular to axis of rotation 201) sits in the above-described space between the front restraining member and the front coupling part.

g. wherein the restraining members are configured to prevent rotation of the bicycle pedal adapter around the central axis thereof during use when the bicycle pedal adapter is coupled with the bicycle pedal, h. wherein the bicycle pedal adapter is configured to be clicked onto the bicycle pedal and to be uncoupled from the bicycle pedal.

Bicycle pedal adapter according to clause 1, wherein the front coupling part comprises a front base part extending downward from the bottom surface and a front protruding part extending in a forward direction from the front base part, wherein the front base part, the front protruding part and the bottom surface define a front clamping member cavity, and wherein the rear coupling part comprises a rear base part extending downward from the bottom surface and a rear protruding part extending in a rearward direction from the rear base part, wherein the rear base part, the rear protruding part and the bottom surface define a rear clamping member cavity.

Bicycle pedal adapter according to clause 1 or 2, the front restraining member comprising a front left face and a front right face configured to abut respectively a left outer side and a right outer side of the first clamping member when coupled with the bicycle pedal, and the rear restraining member comprising a rear left face and a rear right face configured to abut respectively a left outer side and a right outer side of the second clamping member when coupled with the bicycle pedal.

Bicycle pedal adapter according to any one of the preceding clauses, wherein a first width of the front coupling part is smaller than a second width of the rear coupling part.

Bicycle pedal adapter according to one of the preceding clauses, wherein a first distance between a left side and a right side of the front restraining member is smaller than a second distance between a left side and a right side of the rear restraining member.

Bicycle pedal adapter according to any one of the preceding clauses, comprising a left wall extending between a front end of the of the front coupling part and a rear end of the rear coupling part at a left side of the front and rear coupling part, and a right wall extending between a front end of the front coupling part and a rear end of the rear coupling part at a right side of the front and rear coupling part, the left and right wall defining the front and rear restraining members.

Bicycle pedal adapter according to the preceding clause, wherein in side view a concave section is defined between the front coupling part and the rear coupling part, the concave section having an apex between the bottom surface and a free end of the perpendicular part, wherein the concave section is configured to accommodate or abut a central cylindrical part of the bicycle pedal.

Bicycle pedal adapter according to any one of the preceding clauses, wherein a notch of the front and rear restraining members adjacent the corresponding front and rear coupling part extends from the bottom surface to beyond the free end of the respective front and rear coupling parts.

Bicycle pedal adapter according to any one of the clauses 6-8, wherein the left wall and right wall extend from the front end to the rear end, wherein adjacent the front coupling part and rear coupling part the walls increase in height and between the front coupling part and rear coupling part the walls gradually decrease in height, thereby defining the concave section.

Bicycle pedal adapter according to any one of the preceding clauses, comprising a front through hole extending through the top wall at a location directly above the front protruding part, and a rear through hole extending through the top wall at a location directly above the rear protruding part.

Bicycle pedal adapter according to any one of clauses 2-10, comprising a decoupling recess extending through the top wall, and through the front coupling part or rear coupling part, in particular through the base part and/or through the front and/or rear protruding part thereof, wherein the decoupling recess is configured to accommodate a decoupling tool for biasing a corresponding clamping member off the corresponding protruding part of the corresponding coupling.

Bicycle pedal adapter according to any one of clauses 2-11, wherein the front protruding part and/or the rear protruding part comprises a top sloping section.

Bicycle pedal adapter according to any one of clauses 2-12, wherein the front protruding part and/or rear protruding part comprises a bottom sloping section.

Bicycle pedal adapter according to any one of the preceding clauses, wherein the bicycle pedal adapter is an integral body of a single material or an integral body of a single material having only an anti-slip material on the foot support surface and no other materials.

Bicycle pedal adapter according to any one of the preceding clauses, wherein in bottom view the coupling is located in a centre of the bottom surface.

Bicycle pedal adapter according to any one of the preceding clauses, comprising a skirt extending from the bottom surface around the top wall.

Bicycle pedal adapter according to the preceding clause, wherein side skirt sections converge from the rear end to the front end, wherein in side view a bottom edge of the side skirt sections extends above said concave section at said concave section.

Bicycle pedal adapter according to any one of clauses 2-17, wherein the front protruding part has a width which is smaller than a width of the front base part.

Bicycle pedal adapter according to any one of clauses 10-18, wherein a length and a width of the front through hole are larger than a length and a width of the front protruding part.

Bicycle pedal adapter according to any one of clauses 10-19, wherein the front through hole extends from the front base part towards the front end.

Bicycle pedal adapter according to any one of clauses 2-20, wherein the rear protruding part has a width which is smaller than a width of the rear base part.

Bicycle pedal adapter according to any one of the preceding clauses 10-21, wherein a length and a width of the rear through hole are larger than a length and a width of the rear protruding part.

Bicycle pedal adapter according to any one of the preceding clauses 10-21, wherein the rear through hole extends from the rear base part towards the rear end.

Bicycle pedal adapter according to any one of the preceding clauses 2-23, wherein a width of the front base part is smaller than a width of the rear base part.

Bicycle pedal adapter according to any one of the preceding clauses 2-24, wherein a distance between the bottom surface and the front protruding part of rear protruding part is 4-5 mm.

Bicycle pedal adapter according to any one of the preceding clauses 2-25, wherein a width of the front base part is 10-20 mm.

Bicycle pedal adapter according to any one of the preceding clauses 2-26, wherein a width of the rear base part is 20-25 mm.

Bicycle pedal adapter according to any one of the preceding clauses 2-27, wherein a length of the front protruding part and/or a length of the rear protruding part is 2-3 mm.

Bicycle pedal adapter according to any one of the preceding clauses 2-28, wherein a distance between the front base part and the rear base part is 20-25 mm.

Bicycle pedal adapter according to any one of the preceding clauses 2-29, wherein a distance between free ends of the front protruding part and the rear protruding part is 27-32 mm.

Bicycle pedal adapter according to any of the preceding clauses 2-30, wherein the width of the front protruding part is 10-15 mm and wherein the width of the rear protruding part is 17-22 mm.

Bicycle pedal adapter according to any of the preceding clauses 2-31, wherein a height of the front and rear base part perpendicular to the bottom surface is 9-11 mm.

Bicycle pedal adapter according to any of the preceding clauses 2-32, wherein a distance between the front end and the front base part and a distance between the rear end and the rear base part is 25-30 mm.

Bicycle pedal adapter according to any of the preceding clauses 10-33, wherein a length of the front through hole is 4-6 mm and a width of the front through hole is 14-16 mm.

Bicycle pedal adapter according to any of the preceding clauses 10-34, wherein a length of the rear through hole is 4-6 mm and a width of the rear through hole is 20-25 mm.

Bicycle pedal adapter according to any of the preceding clauses, wherein the length of the bicycle pedal adapter is 70-80 mm and the width of the bicycle pedal adapter is 70-80 mm.

Bicycle pedal adapter according to any of the preceding clauses, wherein the height of the bicycle pedal adapter is 10-15 mm.

Bicycle pedal adapter according to any of the preceding clauses, comprising at least one reinforcing rib integrally connected to the bottom surface.

Bicycle pedal adapter according to the preceding clause, wherein the at least one reinforcing rib extends from the front end to the rear end.

Bicycle pedal adapter according to any of the preceding clauses 10-39, wherein the front and rear through hole are substantially rectangular, wherein in top view the through holes extend beyond all free sides of the corresponding protruding part.

Bicycle pedal adapter according to any of the preceding clauses, wherein the foot support surface comprises a plurality of projections for grip.

Bicycle pedal adapter according to any of the preceding clauses, wherein the front end of the bicycle pedal adapter is less wide than the rear end.

Bicycle pedal adapter according to any of the preceding clauses 2-42, wherein the coupling comprises a single, integral base which comprises the front base part, rear base part and an intermediate base part which interconnects the front base part and rear base part.

Bicycle pedal adapter according to the preceding clause, wherein the intermediate part comprises the concave section.

Bicycle pedal adapter according to any one of the preceding clauses 38-44, comprising a left and right reinforcing rib which follow the contour of the base and have a smaller mutual distance between them at the front base part than at the rear base part.

Assembly of the bicycle pedal adapter according to any one of the preceding clauses and a bicycle pedal having a cleat coupling, wherein the cleat coupling comprises a first clamping member which mates with the front coupling part and a second clamping member which mates with the rear coupling part.

Assembly according to clause 46, wherein a bottom sloping section of the front protruding part or rear protruding part is configured to bias the corresponding first or second clamping member in a direction away from the other clamping member when the bicycle pedal adapter is clicked onto the pedal.

Assembly according to clause 46 or 47, wherein the top wall of the bicycle pedal adapter is located above the first clamping member and above the second clamping member of the bicycle pedal.

Assembly according to any one of clauses 46-48, wherein the bicycle pedal adapter extends beyond a free end of the bicycle pedal.

The invention claimed is:

1. A bicycle pedal adapter for providing a pedaling surface on a clipless pedal with multi-sided cleat engagement, the bicycle pedal adapter comprising:
   a top wall comprising a first surface, the first surface providing a foot support and positioned on a side of the top wall distal to a clamping mechanism of the clipless pedal and parallel to an axis of rotation of the clipless pedal on a crank during engagement of the bicycle pedal adapter to the clipless pedal, the top wall further comprising a second surface opposite the first surface and proximate to the clamping mechanism of the clipless pedal during engagement of the bicycle pedal adapter to the clipless pedal;
   a first coupling disposed on a first portion of the second surface, the first coupling extending in a first direction perpendicular to the axis of rotation of the clipless pedal on the crank during engagement of the bicycle pedal adapter to the clipless pedal;
   a second coupling disposed on a second portion of the second surface, the second coupling extending in a second direction perpendicular to the axis of rotation of the clipless pedal on the crank during engagement of the bicycle pedal adapter to the clipless pedal;

a front restraining member disposed on the second surface of the top wall, the front restraining member comprising a first face extending substantially perpendicular to the second surface and a second face extending substantially perpendicular to the second surface; and a rear restraining member disposed on the second surface of the top wall, the rear restraining member comprising a third face extending substantially perpendicular to the second surface and a fourth face extending substantially perpendicular to the second surface, wherein, during engagement of the bicycle pedal adapter to the clipless pedal, the front and rear restraining members restrict rotation of the bicycle pedal adapter around an axis perpendicular to the top wall, and wherein a first distance between the first face and the second face of the front restraining member along a line proximate to the first coupling in a direction parallel to the axis of rotation of the clipless pedal on the crank is smaller than a second distance between the third face and fourth face of the rear restraining member along a line proximate to the second coupling in a direction parallel to the axis of rotation of the clipless pedal on the crank.

2. The bicycle pedal adapter according to claim 1, wherein the first coupling comprises a first protrusion and material defining a first cavity, a front base part extending downward from a bottom surface and a front protruding part extending in a forward direction from the front base part, wherein the front base part, the front protruding part and the bottom surface define a front clamping member cavity wherein the first protrusion contacts the material defining the first cavity, and the first protrusion is positioned distal to the second surface of the top wall relative to the material defining the first cavity, and wherein the second coupling comprises a second protrusion and material defining a second cavity, coupling part comprises a rear base part extending downward from the bottom surface and a rear protruding part extending in a rearward direction from the rear base part, wherein the rear base part, the rear protruding part and the bottom surface define a rear clamping member cavity wherein the second protrusion contacts the material defining the second cavity, and the second protrusion is positioned distal to the second surface of the top wall relative to the material defining the second cavity.

3. The bicycle pedal adapter according to claim 1, wherein the front restraining member comprises a first wall on the second surface of the top wall having first and second portions extending substantially perpendicular to the axis of rotation of the clipless pedal on the crank, and wherein the second restraining member comprises a second wall on the second surface of the top wall having first and second portions extending substantially perpendicular to the axis of rotation of the clipless pedal on the crank.

4. The bicycle pedal adapter according to claim 1, further comprising a concave section disposed between the first coupling and the second coupling, wherein the concave section is configured to accommodate a central cylindrical portion of the clipless pedal during engagement of the bicycle pedal adapter to the clipless pedal.

5. The bicycle pedal adapter according to claim 1, further comprising a first wall extending along the second surface of the top wall along a line proximate to an attachment point of the clipless pedal to the crank and perpendicular to the axis of rotation of the clipless pedal on the crank, the first wall having a height with a first peak proximate to the first coupling and a second peak proximate to the second coupling, and a first concave region between the first peak and the second peak; and a second wall extending along the second surface of the top wall along a line distal to the attachment point of the clipless pedal to the crank and perpendicular to the axis of rotation of the clipless pedal on the crank, the second wall having a height with a third peak proximate to the first coupling and a fourth peak proximate to the second coupling and a second concave region between the third peak and the second peak.

6. The bicycle pedal adapter according to claim 1, wherein the bicycle pedal adapter is an integral body of a single material.

7. A bicycle pedal adapter for providing a pedaling surface on a clipless pedal with multi-sided cleat engagement, the bicycle pedal adapter comprising:

a top wall comprising a first surface, the first surface providing a foot support and positioned on a side of the top wall distal to a clamping mechanism of the clipless pedal and parallel to an axis of rotation of the clipless pedal on a crank during engagement of the bicycle pedal adapter to the clipless pedal, the top wall further comprising a second surface opposite the first surface and proximate to the clamping mechanism of the clipless pedal during engagement of the bicycle pedal adapter to the clipless pedal;

a first coupling disposed on a first portion of the second surface, the first coupling extending in a first direction perpendicular to the axis of rotation of the clipless pedal on the crank during engagement of the bicycle pedal adapter to the clipless pedal;

a second coupling disposed on a second portion of the second surface, the second coupling extending in a second direction perpendicular to the axis of rotation of the clipless pedal on the crank during engagement of the bicycle pedal adapter to the clipless pedal;

a front restraining member disposed on the second surface of the top wall, the front restraining member comprising a first face extending substantially perpendicular to the second surface and a second face extending substantially perpendicular to the second surface; and a rear restraining member disposed on the second surface of the top wall, the rear restraining member comprising a third face extending substantially perpendicular to the second surface and a fourth face extending substantially perpendicular to the second surface, wherein, during engagement of the bicycle pedal adapter to the clipless pedal, the front and rear restraining members restrict rotation of the bicycle pedal adapter around an axis perpendicular to the top wall, wherein the first face and the second face of the front restraining member is disposed at a third distance from the first coupling, the third distance measured in a direction parallel to the axis of rotation of the clipless pedal on the crank.

8. A bicycle pedal adapter for providing a pedaling surface on a clipless pedal with multi-sided cleat engagement, the bicycle pedal adapter comprising:

a top wall comprising a first surface, the first surface providing a foot support and positioned on a side of the top wall distal to a clamping mechanism of the clipless pedal and parallel to an axis of rotation of the clipless pedal on a crank during engagement of the bicycle pedal adapter to the clipless pedal, the top wall further comprising a second surface opposite the first surface and proximate to the clamping mechanism of the clipless pedal during engagement of the bicycle pedal adapter to the clipless pedal;

a first coupling disposed on a first portion of the second surface, the first coupling extending in a first direction perpendicular to the axis of rotation of the clipless pedal on the crank during engagement of the bicycle pedal adapter to the clipless pedal;

a second coupling disposed on a second portion of the second surface, the second coupling extending in a second direction perpendicular to the axis of rotation of the clipless pedal on the crank during engagement of the bicycle pedal adapter to the clipless pedal;

a front restraining member disposed on the second surface of the top wall, the front restraining member comprising a first face extending substantially perpendicular to the second surface and a second face extending substantially perpendicular to the second surface; and a rear restraining member disposed on the second surface of the top wall, the rear restraining member comprising a third face extending substantially perpendicular to the second surface and a fourth face extending substantially perpendicular to the second surface, wherein, during engagement of the bicycle pedal adapter to the clipless pedal, the front and rear restraining members restrict rotation of the bicycle pedal adapter around an axis perpendicular to the top wall, wherein a gap is provided between the first coupling and the front restraining member, wherein the gap is proportioned to accommodate a portion of the clamping mechanism extending substantially perpendicular to the axis of rotation of the clipless pedal on the crank.

* * * * *